United States Patent [19]

Saunders

[11] Patent Number: 5,780,738
[45] Date of Patent: Jul. 14, 1998

[54] SURFACE JET ANGULAR RATE SENSOR

[75] Inventor: Steven E. Saunders, Cupertino, Calif.

[73] Assignee: Interval Research Corporation, Palo Alto, Calif.

[21] Appl. No.: 410,855

[22] Filed: Mar. 27, 1995

[51] Int. Cl.$^6$ ........................................................ G01P 3/26
[52] U.S. Cl. ........................................ 73/504.06; 73/504.17
[58] Field of Search ............................ 73/584.17, 504.06, 73/861.81, 861.35, 861.19

[56] References Cited

U.S. PATENT DOCUMENTS

| | | | |
|---|---|---|---|
| 3,628,371 | 12/1971 | Moore et al. | 73/504.06 |
| 3,640,133 | 2/1972 | Adams | 73/861.19 |
| 3,690,171 | 9/1972 | Tippetts et al. | 73/861.19 |
| 4,202,517 | 5/1980 | Young et al. | 244/3.22 |
| 4,295,373 | 10/1981 | Moffatt | 73/504.06 |
| 4,361,054 | 11/1982 | Bailey | 74/5.6 D |
| 4,592,232 | 6/1986 | Moffatt et al. | 73/504.06 |
| 4,602,509 | 7/1986 | Berdahl | 73/504.06 |
| 4,610,162 | 9/1986 | Okabayashi et al. | 73/861.19 |
| 4,843,889 | 7/1989 | Mansy et al. | 73/861.19 |
| 5,063,786 | 11/1991 | Sanderson et al. | 73/861.19 |
| 5,157,974 | 10/1992 | Hattori et al. | 73/861.19 |
| 5,218,872 | 6/1993 | Hattori et al. | 73/861.19 |
| 5,363,704 | 11/1994 | Huang et al. | 73/861.19 |
| 5,396,808 | 3/1995 | Huang et al. | 73/861.19 |

OTHER PUBLICATIONS

Humphrey, Inc., Summary Catalog, (undated).
Measurements & Control, "Fluidic Angular Rate Sensors", by Ricardo E. Dao, Feb., 1994.

Primary Examiner—Hezron E. Williams
Assistant Examiner—Helen C. Kwok
Attorney, Agent, or Firm—Brooks & Kushman

[57] ABSTRACT

An apparatus for sensing an angular rate of motion includes a body which defines a surface having a protuberant portion, and an orifice through the surface and proximate to the protuberant portion through which a fluid jet is directed along an initial jet axis. The protuberant portion directs the fluid jet in a path along the surface in accordance with the Coanda effect. A first flow sensor is fixed relative to the body and proximate to the path of the fluid jet along the surface of the body. The first flow sensor produces a first indication of a rate of flow of a first portion of the fluid jet proximate thereto. A second flow sensor is fixed relative to the body and proximate to the path of the fluid jet along the surface of the body. The second flow sensor produces a second indication of a rate of flow of a second portion of the fluid jet proximate thereto. The angular rate of motion of the body is sensed in dependence upon the first indication and the second indication.

18 Claims, 1 Drawing Sheet

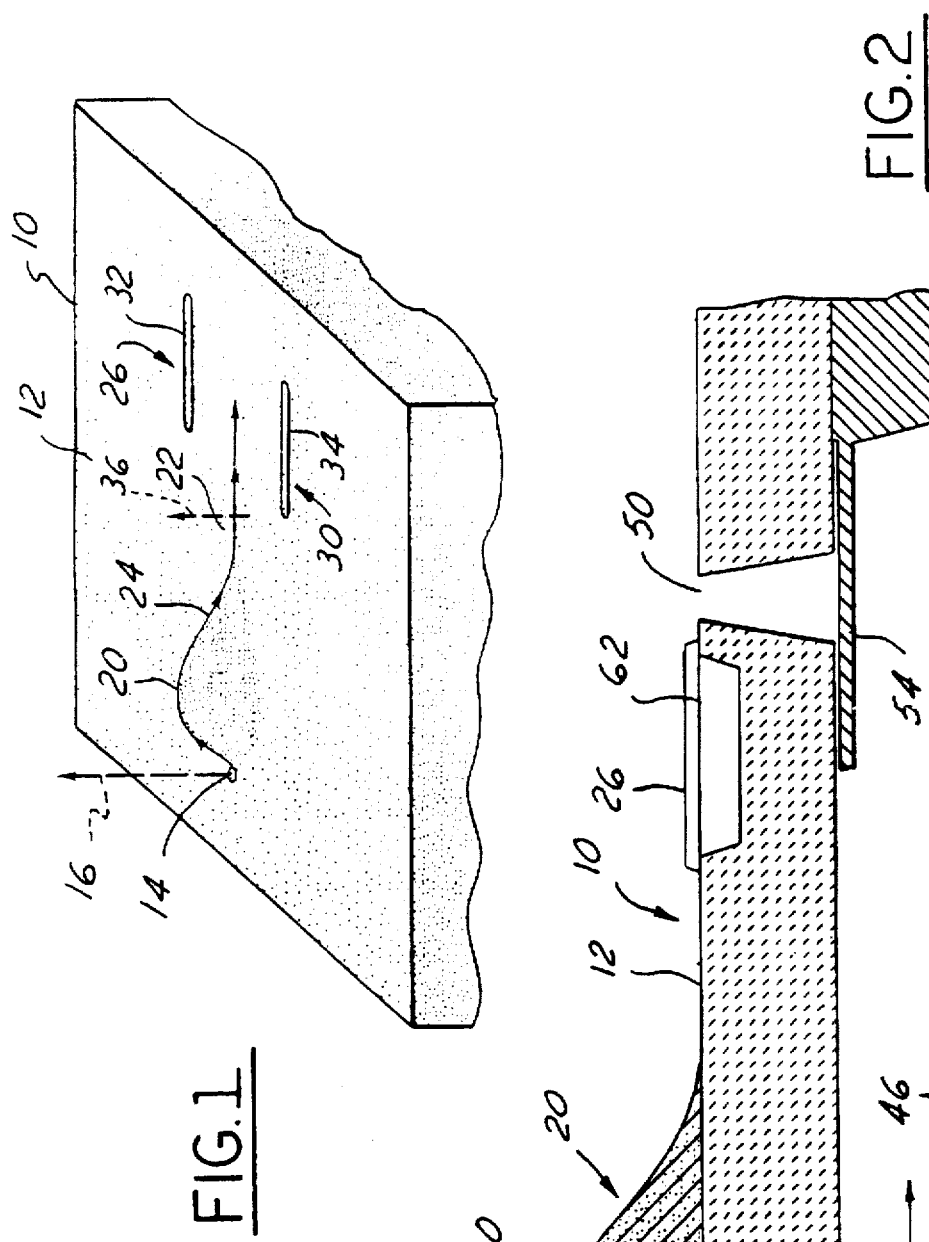

SURFACE JET ANGULAR RATE SENSOR

TECHNICAL FIELD

The present invention relates to angular rate sensors, and more particularly, to fluidic angular rate sensors.

BACKGROUND OF THE INVENTION

An angular rate sensor is a transducer capable of producing an indication of an angular rate of motion being sensed. Typically, an angular rate sensor produces an electrical signal, such as an output voltage, proportional to the mechanical angular rate of motion (or angular velocity) of the sensor. Generally, however, other alternative types of indications may be produced.

An angular rate sensor may be classified according to the sensing technology employed therein. Present classes of angular rate sensors include magnetic-field-motion sensors, piezoelectric-vibration sensors, fluidic sensors, gyroscopic sensors, and fiber-optic-laser sensors.

In a fluidic angular rate sensor, a fluid (such as helium gas) is continuously forced through a nozzle to form a laminar flow stream. A pair of hot-wire anemometers are positioned downstream and oriented transverse to the flow. A bridge circuit utilizes the pair of hot-wire anemometers to form an output voltage proportionate to the angular velocity.

When the sensor is at rest, the flow cools the hot-wire anemometers equally, and the bridge circuit produces an output indicative of zero rotation. When angular motion is applied to the sensor, the flow is directed more toward one of the hot-wire anemometers in accordance with Newton's Second Law. As a result, the one of the hot-wire anemometers loses heat more rapidly than the other of the hot-wire anemometers. The difference in flow between the hot-wire anemometers is used by the bridge circuit to form an output indicative of the angular rate of motion.

Fluidic angular rate sensors may be employed in a variety of different applications, including guidance and control of aircraft, helicopters, missiles, and remote vehicles. However, the size of fluidic sensors, which typically have a smallest dimension of approximately an inch, may be limiting in some applications.

SUMMARY OF THE INVENTION

It is thus an object of the present invention to provide an angular rate sensor having reduced physical dimensions.

Another object of the present invention is to provide an angular rate sensor which can be constructed using micromachining technology.

In carrying out the above objects, the present invention provides an apparatus for sensing an angular rate of motion. A body defines a surface having a portion which curves away from an initial jet axis, and an orifice through the surface and proximate to the curved portion through which a fluid jet is directed along the initial jet axis. The curved portion directs the fluid jet in a path along the surface in accordance with the Coanda effect. At least one sensor is included for sensing a lateral position of the fluid jet relative to the body caused by the angular rate of motion of the body. The at least one sensor produces an indication of the angular rate of motion of the body based upon the lateral position.

In a preferred embodiment, the at least one sensor includes a first flow sensor and a second flow sensor. The first flow sensor is fixed relative to the body and proximate to the path of the fluid jet along the surface of the body. The first flow sensor produces a first indication of a rate of flow of a first portion of the fluid jet proximate thereto. The second flow sensor is fixed relative to the body and proximate to the path of the fluid jet along the surface of the body. The second flow sensor produces a second indication of a rate of flow of a second portion of the fluid jet proximate thereto. The indication of the angular rate of motion of the body is sensed in dependence upon the first indication and the second indication.

Embodiments of the present invention are advantageous in that they may be constructed using micromachining technology, and hence, have reduced physical dimensions.

These and other features, aspects, and advantages of the present invention will become better understood with regard to the following description, appended claims, and accompanying drawings.

BRIEF DESCRIPTION OF THE DRAWINGS

FIG. 1 is a perspective view of an embodiment of an angular rate sensor in accordance with the present invention; and FIG. 2 is a side view of an embodiment of an angular rate sensor in accordance with the present invention.

BEST MODE FOR CARRYING OUT THE INVENTION

FIG. 1 is a perspective view of an embodiment of an apparatus for sensing an angular rate of motion in accordance with the present invention. The apparatus includes a body 10 having a surface 12. The body 10 defines an orifice 14 through which a fluid jet is directed along an initial axis 16. The fluid jet may comprise a jet of a liquid, or preferably, a jet of a gas such as air.

The surface 12 includes a curved protuberant portion or member 20 (which also may be described as a bump or a bulge) and a generally flat portion 22. The orifice 14 is located proximate to the curved portion 20 of the surface 12. The curved portion 20 acts to redirect the fluid jet away from the initial jet axis 16. In particular, the fluid jet attaches itself to the portion 20 of the surface 12, and follows a path 24 along the portion 20 toward the generally flat portion 22. In general, the tendency of a fluid jet to attach itself to a downstream surface generally parallel to a jet axis, and deflect from the original direction if the surface curves away from the jet axis is known as the Coanda effect.

The apparatus further includes at least one sensor for sensing a lateral position of the fluid jet relative to the body caused by the angular rate of motion of the body. The at least one sensor produces an indication of the angular rate of motion of the body based upon the lateral position of the fluid jet.

In a preferred embodiment, the at least one sensor includes a first flow sensor 26 and a second flow sensor 30, each located in a fixed position relative to the body 10. The flow sensors 26 and 30 are proximate to the path 24 of the fluid jet along the surface of the body. The flow sensor 26 produces an indication of the rate of flow of a first portion of the fluid jet proximate thereto. Similarly, the flow sensor 30 produces an indication of the rate of flow of a second portion of the fluid jet proximate thereto. The indications may be in the form of electrical signals representative of the rate of flow, or changes in resistance representative of the rate of flow.

The flow sensors 26 and 30 are preferably comprised of a pair of anemometers for sensing the rate of gas flow. More preferably, the flow sensors 26 and 30 comprise a pair of hot-strip, anemometers having strips 32 and 34 affixed to the generally flat portion 22 of the surface 12. The strips 32 and 34 are oriented generally in the direction of the path 24 of the fluid jet. Moreover, the strips 32 and 34 are oriented generally parallel to and alongside one another. Typically, the strips 32 and 34 straddle the path 24 of the fluid jet when the apparatus is at rest, so that the rate of flow of the first portion and the second portion of the fluid jet are about the same. It is noted that the term "hot-strip anemometer" is inclusive of hot-wire anemometers, hot-film anemometers, and like equivalents.

An angular rate of motion of the body 10 about an axis of rotation 36 moves one of the flow sensors 26 and 30 more toward the center of the path 24 of the fluid jet, and moves the other of the flow sensors 26 and 30 away from the path 24. The axis of rotation 36 to be sensed is transverse, and preferably normal, to the substantially flat portion 22 of the body 10.

A clockwise motion of the body 10 about the axis 36 moves the flow sensor 26 toward the path 24, and moves the flow sensor 30 away from the path. As a result, the rate of flow sensed by the flow sensor 26 is greater than the rate of flow sensed by the flow sensor 30 for a clockwise motion. Similarly, a counterclockwise motion of the body 10 about the axis 36 moves the flow sensor 26 away from the path 24, and moves the flow sensor 30 toward the path. As a result, the rate of flow sensed by the flow sensor 30 is greater than the rate of flow sensed by the flow sensor 26 for a counter-clockwise motion.

The angular rate of motion of the body 10 is sensed in dependence upon the indications produced by the flow sensors 26 and 30. Preferably, the angular rate of motion is based upon a difference in the rates of flow indications produced by the flow sensors 26 and 30.

Using hot-strip anemometers, the strips 32 and 34, which are each heated by a corresponding current source (not specifically illustrated), lose heat due to the flow of the gas in proximity thereto. More particularly, the rate of heat loss is dependent upon the rate of the flow of the gas. Consequently, a rotational motion of the body 10 causes one of the strips 32 and 34 to lose heat more rapidly than the other of the strips 32 and 34.

The hot-strip anemometers may be operated in a constant-current mode or a constant temperature mode. In the constant-current mode, the strips 32 and 34 are heated by corresponding constant current supplies. For increasing flow rates incident on a strip, the temperature of the strip decreases. A change in temperature results in a change in the resistance of the strip. A bridge circuit may be employed to convert the change in resistance to a voltage. In the constant temperature mode, the current used to heat the strips is based upon the output of a bridge circuit.

Alternatively, the at least one sensor for sensing the lateral position of the fluid jet relative to the body may include an optical sensor (not specifically illustrated) such as a lateral-effect photodiode or a CCD array placed transverse to the path 24 of the fluid jet. To facilitate optical sensing of the lateral position of the fluid jet, it is preferred to select a fluid which modifies the transmittance of predetermined wavelengths of light. For this purpose, the fluid jet may comprise a gas containing smoke-like particles.

As another alternative, the at least one sensor may include a plurality of capacitive sensors (not specifically illustrated) placed transverse to the path 24 of the fluid jet. The capacitive sensors each produce an indication, in the form of a capacitance, of the flow rate of the fluid jet in proximity thereto. Based upon the plurality of capacitive indications, an indication of the angular rate of motion is produced.

The capacitive sensors may be in the form of a plurality of mechanical flaps mounted near the surface 12 of the body 10. Each of the mechanical flaps is displaced proportionate to the flow rate of the fluid jet in proximity thereto. The displacement of a flap modifies a capacitance measure associated therewith.

FIG. 2 is a side view of an embodiment of an apparatus for sensing an angular rate of motion in accordance with the present invention. The apparatus includes a pump 40 adjacent to a pump chamber 42 defined by the body 10. The pump 40 produces an increased fluid pressure within the pump chamber 42 relative to outside the pump chamber 42. As a result, a fluid jet is forced through the orifice 14 adjacent to the pump chamber 42.

Preferably, the pump 40 includes a piezoelectric member 44 having a diaphragm which is strained in response to an electrical signal applied thereto. Straining the diaphragm of the piezoelectric member 44 in a direction 46 causes the fluid jet to be forced through the orifice 14.

The body 10 may further define a channel 50 which provides a return path for fluid into the pump chamber 42 when the diaphragm is returned in an opposite direction 52. A flap 54 may be employed to block the return path when the diaphragm is producing the fluid jet. The resulting vibration of the piezoelectric member 44 by alternately straining and unstraining the diaphragm produces pulses of fluid jets which emanate from the orifice 14.

The portion 20 which curves away from the initial jet axis of the surface 12 in the embodiment of FIG. 2 has a first portion 56 which is generally parallel to the initial jet axis 16. The fluid jet emanating from the orifice 14 initially attaches itself to the first portion 56 according to the Coanda effect. The portion 20 has a second portion 60 adjacent to the first portion 56. The second portion 60 has a skewed profile which curves away from the initial jet axis 16, and tails-off toward the flow sensors 26 and 30. The second portion 60 causes the fluid jet to deflect from the initial jet axis 16 toward the flow sensors 26 and 30 according to the Coanda effect.

The apparatus is preferably constructed on a single substrate using micromachining technology. Micromachining technology, in general, allows a three-dimensional microstructure to be produced using integrated-circuit-fabrication techniques such as photolithography and batch processing. Consequently, the surface 12 of the body 10 may be formed by an etched silicon substrate, wherein the depth of etching into the substrate is modified in the area forming the portion 20. Alternatively, portion 20 may be formed by a step of deposition onto a substantially flat substrate.

In a similar manner, other elements of the apparatus such as the pump 40, the pump chamber 42, the orifice 14, the channel 50, and the hot-strip anemometers may be formed on the substrate using micromachining and microsensor technology. Typically, the micromachined hot-strip anemometers are suspended above a cavity 62 defined by the substrate in order to provide thermal isolation. Moreover, an integrated circuit which forms a single electrical signal indicative of the angular rate of motion based upon the electrical signals produced by the flow sensors 26 and 30 may be included on the substrate.

The above-described embodiments of the present invention have many advantages. By utilizing the Coanda effect, the apparatus may be realized with reduced physical dimensions in comparison to previous angular rate sensors. In particular, the body of the apparatus is substantially flat normal to the sensed axis of rotation. Consequently, the physical dimension of the apparatus along the sensed axis of rotation is reduced for embodiments of the present invention.

Further, the apparatus contains elements which can be constructed using micromachining technologies. In particular, the body, the pump, and the flow sensors of the apparatus are capable of implementation using existing micromachining and integrated circuit technologies. As a result, embodiments of the present invention may be implemented on single chip, thus greatly extending the realm of application thereof. For example, the present invention may be applied in applications such as miniature navigation systems, and head tracking systems used in virtual reality applications.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. An apparatus for sensing an angular rate of motion, the apparatus comprising:
    a body which defines a surface having a substantially flat portion, the body defining an orifice through the surface through which a fluid jet is directed along an initial jet axis, the surface including a portion proximate the orifice which curves away from the initial let axis to direct a portion of the fluid jet in a path along the surface due to the Coanda effect; and
    at least one sensor having at least a portion thereof attached to the substantially flat portion of the surface for sensing a lateral position of the fluid jet relative to the body caused by the angular rate of motion of the body, the at least one sensor producing an indication of the angular rate of motion of the body based upon the lateral position.

2. The apparatus of claim 1 wherein the body is formed of a micromachined silicon substrate.

3. The apparatus of claim 1 wherein the at least one sensor includes:
    a first flow sensor in a fixed position relative to the body, the first flow sensor proximate to the path of the fluid jet along the surface of the body, the first flow sensor producing a first indication of a rate of flow of a first portion of the fluid jet proximate thereto; and
    a second flow sensor in a fixed position relative to the body, the second flow sensor proximate to the path of the fluid jet along the surface of the body, the second flow sensor producing a second indication of a rate of flow of a second portion of the fluid jet proximate thereto;
    wherein the indication of the angular rate of motion of the body is sensed in dependence upon a difference between the first indication and the second indication.

4. The apparatus of claim 1 wherein the portion proximate the orifice has a first portion which is generally parallel to the initial jet axis.

5. The apparatus of claim 4 wherein the portion of the surface proximate the orifice has a second portion adjacent to the first portion, the second portion skewed toward the at least one sensor.

6. The apparatus of claim 1 further comprising a pump which forces the fluid jet through the orifice of the body.

7. The apparatus of claim 6 wherein the body defines a pump chamber adjacent to the orifice, wherein the pump produces an increased fluid pressure within the pump chamber relative to outside the pump chamber so that the fluid jet is forced through the orifice.

8. The apparatus of claim 7 wherein the pump includes a piezoelectric member for increasing the fluid pressure within the pump chamber in response to an electrical signal applied thereto.

9. The apparatus of claim 1 wherein the portion proximate the orifice includes a protuberant portion, and wherein the protuberant portion directs the fluid jet in a path along the surface toward the substantially flat portion.

10. The apparatus of claim 9 wherein the angular rate of motion is sensed along an axis transverse to the substantially flat portion of the surface.

11. The apparatus of claim 9 wherein the at least one sensor includes:
    a first flow sensor in a fixed position relative to the body, the first flow sensor proximate to the path of the fluid jet along the surface of the body, the first flow sensor producing a first indication of a rate of flow of a first portion of the fluid jet proximate thereto; and
    a second flow sensor in a fixed position relative to the body, the second flow sensor proximate to the path of the fluid jet along the surface of the body, the second flow sensor producing a second indication of a rate of flow of a second portion of the fluid jet proximate thereto;
    wherein the indication of the angular rate of motion of the body is sensed in dependence upon a difference between the first indication and the second indication.

12. The apparatus of claim 11 wherein the first flow sensor includes a first hot-strip anemometer having a first strip affixed to the flat portion of the surface of the body, the first strip oriented generally in the direction of the path of the fluid jet along the surface.

13. The apparatus of claim 12 wherein the resistance of the first strip provides the first indication of the rate of flow.

14. The apparatus of claim 12 wherein the body defines a cavity above which the first strip is suspended.

15. The apparatus of claim 12 wherein the second flow sensor includes a second hot-strip anemometer having a second strip affixed to the flat portion of the surface of the body, the second strip oriented generally parallel to the first strip.

16. The apparatus of claim 15 wherein the resistance of the second strip provides the second indication of the rate of flow.

17. The apparatus of claim 15 wherein the body defines a cavity above which the second strip is suspended.

18. An apparatus for sensing an angular rate of motion along an axis, the apparatus comprising:
    a body which defines a surface having a generally flat portion, the body defining a chamber and an orifice, the orifice extending from the chamber to the surface, wherein the body is formed of a micromachined substrate;
    a pump having a piezoelectric member which forces a fluid from the chamber through the orifice to form a fluid let in response to an electrical signal applied to the member, wherein the fluid jet is initially directed along a first axis, and wherein the orifice directs a portion of the fluid jet in a path along the surface toward the flat portion due to the Coanda effect;

a first hot-strip anemometer having a first strip affixed to the flat portion of the surface, the first strip proximate to the path of the fluid jet along the surface of the body, the first strip oriented generally in the direction of the path, the first hot-strip anemometer producing a first resistance indicative of a rate of flow of a first portion of the fluid jet proximate thereto; and a second hot-strip anemometer having a second strip affixed to the flat portion of the surface and oriented generally parallel to the first strip, the second strip proximate to the path of the fluid jet along the surface of the body, the second hot-strip anemometer producing a second resistance indicative of a rate of flow of a second portion of the fluid jet proximate thereto;

wherein the angular rate of motion of the body is sensed in dependence upon a difference between the first resistance and the second resistance.

* * * * *

UNITED STATES PATENT AND TRADEMARK OFFICE
CERTIFICATE OF CORRECTION

PATENT NO   : 5,780,738
DATED       : July 14, 1998
INVENTOR(S) : Steven E. Saunders It is certified that error appears in the above-identified patent and that said Letters Patent is hereby corrected as shown below:

Column 5, line 32, Claim 2, delete "let" and insert – jet – ;

Column 6, line 63, Claim 18, delete "let" and insert – jet – ;

Signed and Sealed this

Seventeenth Day of November, 1998

Attest:

BRUCE LEHMAN

*Attesting Officer*    *Commissioner of Patents and Trademarks*